C. W. HOTTMANN.
CONDENSER AND SEPARATOR.
APPLICATION FILED NOV. 26, 1918.
1,342,810.
Patented June 8, 1920.
2 SHEETS—SHEET 2.
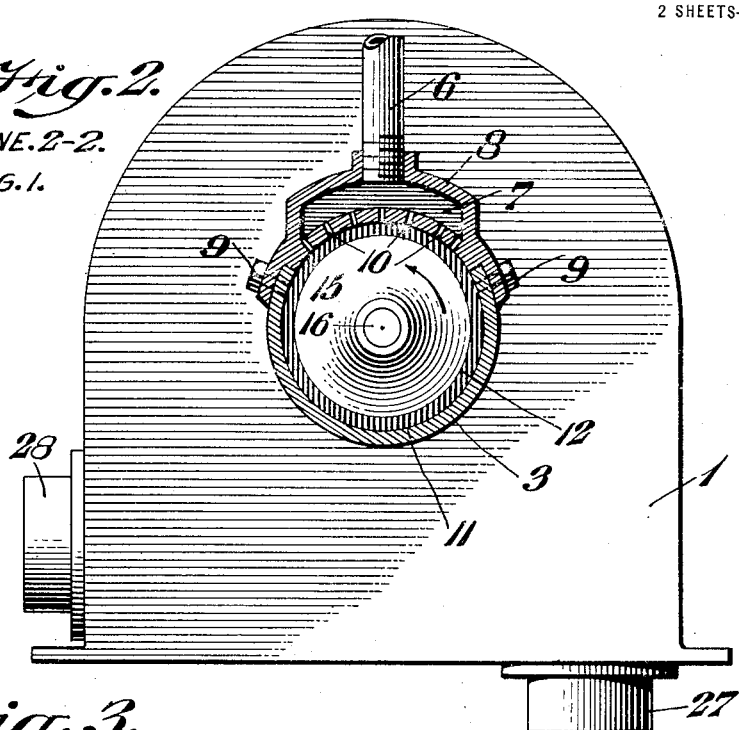
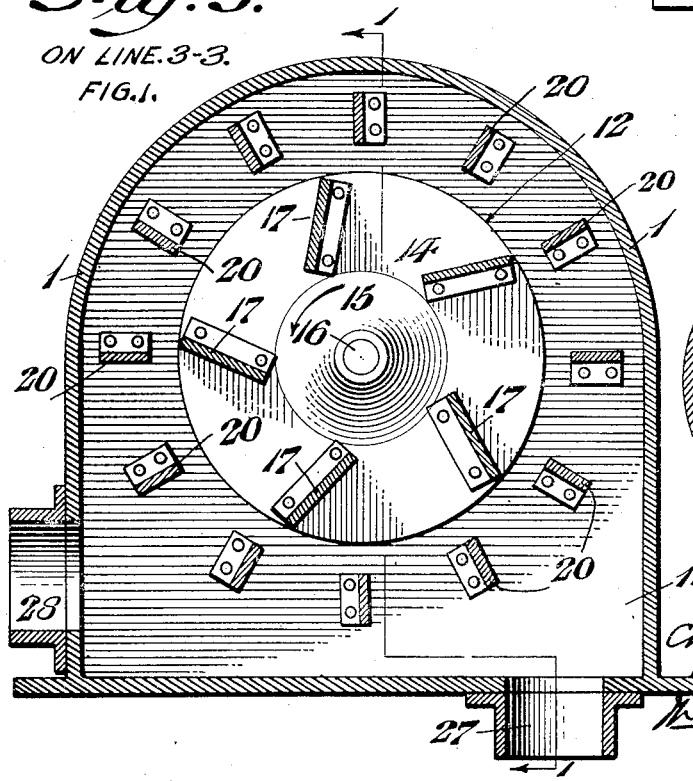
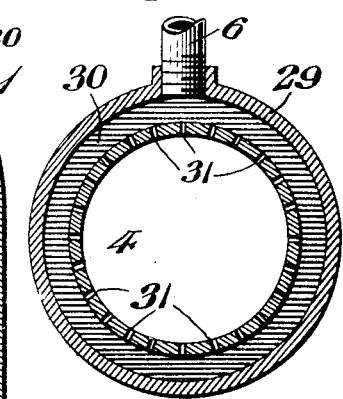

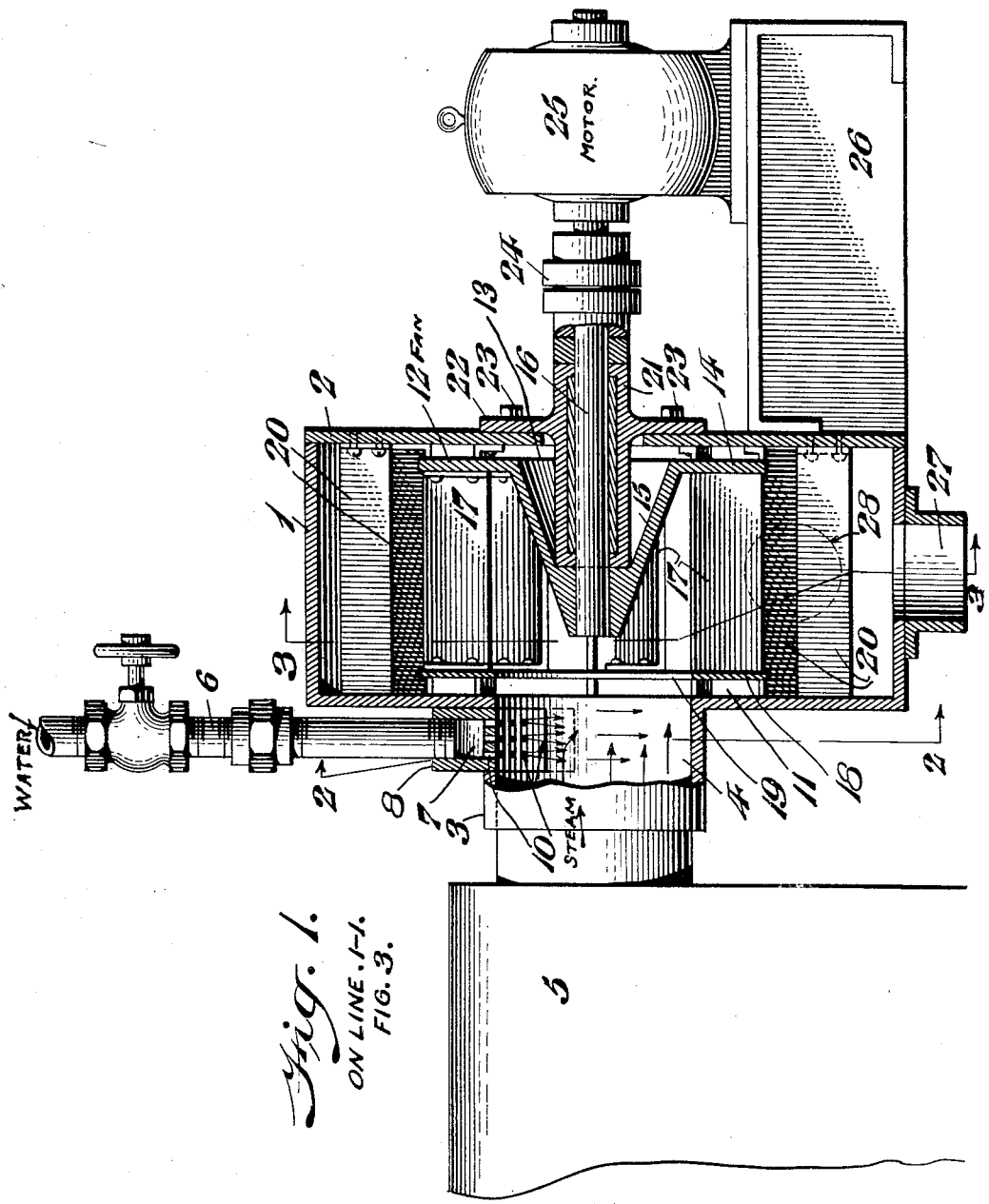

UNITED STATES PATENT OFFICE.

CHARLES W. HOTTMANN, OF PHILADELPHIA, PENNSYLVANIA, ASSIGNOR, BY DIRECT AND MESNE ASSIGNMENTS, TO THE HOTTMANN MACHINE COMPANY, OF PHILADELPHIA, PENNSYLVANIA, A CORPORATION OF DELAWARE.

CONDENSER AND SEPARATOR.

1,342,810.     Specification of Letters Patent.    Patented June 8, 1920.

Application filed November 26, 1918. Serial No. 264,153.

*To all whom it may concern:*

Be it known that I, CHARLES W. HOTTMANN, a citizen of the United States, residing in the city and county of Philadelphia, State of Pennsylvania, have invented a new and useful Condenser and Separator, of which the following is a specification.

My present invention comprehends a novel construction and arrangement of a condenser and separator which is especially designed to be employed in conjunction with fat drying machines, although as is apparent it is not limited to such use and may be employed in conjunction with any desired mechanism wherein it is desired to condense steam or other vapors.

One of the main objects of my invention is to devise novel means for commingling the water and steam in such a manner that they will come together in the form of a mist or fine vapor. The water is injected into the path of the incoming steam and the vapors are directed against the blades of a rapidly rotating fan. Stationary baffles are also provided and the water and odors absorbed by the water pass from the condenser through a discharge outlet.

My invention further consists of a novel construction and arrangement of a water inlet, a steam inlet, a condenser casing and a fan.

Other novel features of construction and advantage will hereinafter more clearly appear in the detailed description and the appended claims.

For the purpose of illustrating my invention, I have shown in the accompanying drawings a typical embodiment of it which in practice will give satisfactory and reliable results. It is, however, to be understood that this embodiment is typical only and that the various instrumentalities of which my invention consists can be variously arranged and organized and that my invention is not limited to the precise arrangement and organization of these instrumentalities as herein set forth.

Figure 1 represents a section, on line 1—1 of Fig. 3, of a condenser and separator embodying my invention, illustrated in conjunction with a drying machine.

Fig. 2 represents a section on line 2—2 of Fig. 1.

Fig. 3 represents a section on line 3—3 of Fig. 1.

Fig. 4 represents a sectional view of another embodiment of my invention, showing the water chamber as surrounding the steam conduit.

Similar numerals of reference indicate corresponding parts in the figures.

Referring to the drawings:

1 designates the casing of a condenser or separator, embodying my invention. The casing 1 preferably has a removable side 2 secured to its body portion in any desired manner. The casing is also provided with a conduit 3 forming a steam inlet 4 which communicates with the fat drier or other mechanism 5 from which the steam is to be withdrawn and condensed. 6 designates a valve controlled water conduit which communicates with a water chamber 7 of a casing 8 secured to the conduit 3 by means of fastening devices 9. For convenience of illustration I have shown the conduit 3 as having a portion of its wall cut away so that the casing 8 can be set therein.

The bottom of the water chamber communicates by means of ports 10, preferably arranged radially, with the interior of the conduit 3 so that the water is injected in the form of a spray into the steam passing through the conduit 3 into the condenser chamber 11.

12 designates a fan which is constructed in a novel manner as will be now explained.

13 designates a body portion having an outwardly extending annular flange 14 and a conical shaped lateral extension 15 which is fixed in any desired manner on a driven shaft 16.

17 designates fan blades which have foot flanges secured to the flange 14 and at their opposite ends they are provided with foot flanges secured to a disk 18 which is centrally apertured as at 19.

20 designates stationary baffle plates which have at one end foot flanges secured to the removable end plate 2, so that when such plate is removed from the casing 1, the fan and the stationary baffles will be removed as a unit of structure with it.

The shaft 16 is journaled in a bearing 21 extending through the end plate 2 and having a flange 22 secured to such end plate by fastening devices 23. The shaft 16 is driven by means of any desired type of power and for purposes of illustration has been shown as connected by means of a flexible coupling 24 with an electric motor 25 carried by a foundation 26.

27 designates a water outlet.

I preferably also employ an outlet 28, located at any desired place above the water outlet so that the working of the machine may be readily inspected, but this may be dispensed with if desired.

It is also within the scope of my invention to employ a water chamber as shown in Fig. 4, wherein a casing 29 surrounds the conduit 3 and is secured to it in a similar manner to that shown in Fig. 1.

The casing 29 has an annular water chamber 30, in communication with the valve controlled water inlet 6, and such chamber 30 communicates by means of ports 31, preferably radially arranged, with the steam inlet 4 of the condenser.

In the operation, the valve is opened in the water conduit 6 to cause the requisite amount of water to be injected into the steam inlet 4 and such water with the steam passes through the opening or aperture 19 of the fan 12 and impinges against the conical extension 15 which acts as a spreader to deflect the water and steam against the rapidly revolving fan blades 17. These blades are inclined and coöperate with the stationary baffles 20 to cause the water to assume the form of a mist and to commingle with the steam. The result of this in practice is that the steam and odors carried thereby are absorbed by the water and pass from the condenser through the water outlets 27.

If the valve of the water conduit is only slightly opened the steam will pass from the conduit 27 and such valve is opened wider until the steam ceases to issue from such conduit 27.

By the employment of my present invention, not only is the steam condensed but any obnoxious odors carried by the steam are also absorbed without passing into the room in which the condenser is located.

It will now be apparent that I have devised a new and useful construction of a condenser or separator which embodies the features of advantage enumerated as desirable in the statement of the invention and the above description and while I have, in the present instance, shown and described a preferred embodiment thereof which will be found in practice to give satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a machine of the character stated, a condenser casing having a steam inlet and a discharge port, means to inject water into said steam inlet, and a fan mounted to revolve within said casing having an opening in proximity to said steam inlet and provided with means to deflect the incoming vapors toward its blades.

2. In a machine of the character stated, a condenser casing having a steam inlet and a discharge port, means to inject water into said steam inlet, a fan mounted to revolve within said casing having an opening in proximity to said steam inlet and provided with means to deflect the incoming vapors toward the blades, and stationary baffles within said casing.

3. In a machine of the character stated, a condenser casing having a steam inlet and a discharge port, means to inject water into said steam inlet, a fan mounted to revolve within said casing having an opening in proximity to said steam inlet and provided with means to deflect the incoming vapors toward its blades, and stationary baffles within said casing spaced from the outer periphery of said fan.

4. In a machine of the character stated, a condenser casing having a steam inlet and a water outlet and provided with a removable side, means to introduce water into said steam inlet, a fan secured to said casing side and removable as a unit of structure with it, said fan having a central opening presented to said steam inlet, and baffles carried by said removable side and removable as a unit of structure with such side.

5. In a machine of the character stated, a condenser casing having an inlet and an outlet, a water chamber positioned around said inlet having ports communicating with it, said casing being provided with a removable side, a bearing carried by said side, a shaft for said bearing, and a fan on said shaft to revolve within said casing.

6. In a machine of the character stated, a condenser casing having a steam inlet and a water outlet, a water chamber having ports around the steam inlet and communicating therewith, means to control the flow of water to said water chamber, a fan within said casing having a centrally located opening at one side presented to said steam inlet and provided with a centrally located conical shaped member presented to said opening, said fan having inclined blades at its periphery, baffles within said casing, and means to effect the rotation of said fan.

CHARLES W. HOTTMANN.

Witnesses:
H. S. FAIRBANKS,
C. D. McVAY.